(12) United States Patent
Colletta et al.

(10) Patent No.: US 10,543,544 B2
(45) Date of Patent: Jan. 28, 2020

(54) TOOL FOR FINE MACHINING OF BORES

(71) Applicant: KOMET GROUP GMBH, Besigheim (DE)

(72) Inventors: Cristian Colletta, Asperg (DE); Wolfgang Bierl, Güglingen (DE); Simone Nägele, Hessigheim (DE); Waldemar Dubs, Ludwigsburg (DE); Frederik Peters, Stuttgart (DE); Peter Leuze, Walheim (DE)

(73) Assignee: KOMET GROUP GMBH, Besigheim (DE)

(*) Notice: Subject to any disclaimer, the term of this patent is extended or adjusted under 35 U.S.C. 154(b) by 0 days.

(21) Appl. No.: 15/903,893

(22) Filed: Feb. 23, 2018

(65) Prior Publication Data

US 2018/0178300 A1    Jun. 28, 2018

Related U.S. Application Data

(63) Continuation of application No. PCT/EP2016/069938, filed on Aug. 24, 2016.

(30) Foreign Application Priority Data

Aug. 25, 2015 (DE) .................. 10 2015 216 203

(51) Int. Cl.
*B23D 77/02* (2006.01)
*B23B 29/03* (2006.01)

(52) U.S. Cl.
CPC .......... *B23D 77/025* (2013.01); *B23B 29/03* (2013.01); *B23D 77/02* (2013.01);
(Continued)

(58) Field of Classification Search
CPC .............. B23B 29/03; B23D 2277/064; B23D 2277/84; B23D 77/025; B23D 2277/205; B23D 2277/206; B23D 77/02
See application file for complete search history.

(56) References Cited

U.S. PATENT DOCUMENTS 3,555,644 A    1/1971   Owen
3,660,879 A *  5/1972   Erkfritz ................. B23C 5/2269
                                                            407/41
(Continued)

FOREIGN PATENT DOCUMENTS

CA         945750 A      4/1974
DE     21 10 078 A1      9/1971
(Continued)

OTHER PUBLICATIONS

English Translation of International Preliminary Report on Patentability, PCT/EP2016/069938, dated Aug. 31, 2017, 5 pages.

*Primary Examiner* — Sara Addisu

(74) *Attorney, Agent, or Firm* — Bose McKinney & Evans LLP

(57) ABSTRACT

This disclosure relates to a machine tool comprising a tool holder which rotates relative to a workpiece to be machined and has a tool axis, and a plurality of cutting inserts that are removably attached to the tool holder, the active cutting edges of said cutting inserts having a common cutting circle which is coaxial to the tool axis. According to this disclosure, the tool holder has a cylinder-type insert seat shell for radially positioning the cutting inserts, which rotates about the tool axis. The cutting inserts have at least one contact surface that can be brought into contact with the insert seat shell.

21 Claims, 5 Drawing Sheets

(52) U.S. Cl.
CPC .. *B23D 2277/064* (2013.01); *B23D 2277/205* (2013.01); *B23D 2277/206* (2013.01); *B23D 2277/60* (2013.01); *B23D 2277/84* (2013.01)

(56) References Cited

U.S. PATENT DOCUMENTS

| | | | | |
|---|---|---|---|---|
| 9,144,848 | B2 * | 9/2015 | Konta | ............ B23C 5/109 |
| 2010/0135735 | A1 | 6/2010 | Satran et al. | |
| 2010/0183384 | A1 * | 7/2010 | Kruszynski | ............ B23D 77/02 |
| | | | | 407/67 |

FOREIGN PATENT DOCUMENTS

| | | |
|---|---|---|
| DE | 31 35 964 A1 | 4/1982 |
| DE | 10 2006 024 569 A1 | 12/2007 |
| DE | 10 2006 028 729 A1 | 12/2007 |
| FR | 2 660 887 A1 | 10/1991 |
| GB | 2 032 820 A | 5/1980 |
| JP | 2012139813 A * 7/2012 ......... B32B 27/1622 |
| WO | WO 2010/056021 A2 | 5/2010 |

* cited by examiner

TOOL FOR FINE MACHINING OF BORES

RELATED APPLICATIONS

This application is a continuation of PCT/EP2016/069938, filed Aug. 24, 2016, which claims priority to DE 10 2015 216 203.6, filed Aug. 25, 2015, both of which are hereby incorporated herein by reference in their entirety.

BACKGROUND

This disclosure relates to a machine tool, in particular a reaming tool for the fine machining of bores. Machine tools of this type have a tool holder which rotates relative to a workpiece to be machined and a tool axis. A plurality of cutting inserts are removably attached to the tool holder, the active cutting edges of the cutting inserts having a common cutting circle which is coaxial to the tool axis.

Reaming is a machining process with geometrically defined cutters, wherein contrary to solid drilling or boring the work is done only with small chipping cross sections in already processed bores. The over-dimensions or reaming additions in the diameter are typically in the range from 0.1 to 0.5 mm. A reaming tool should guarantee a high boring quality for a plurality of components, with minimal tolerances in diameter as well as in the form and position of the bores and their roughness. In order to keep the precision of the boring within the range of some micrometers, reaming tools are typically individually adapted to the processing task. This precision may generally be obtained by a precisely defined grinding of cutting bodies, which are solidly connected to the tool holder. In order to improve the performance, also the lining of cutting bodies has been positively used, wherein releasable cutting bodies after grinding have to be dismounted again for coating and then again mounted in their original insert seat, in order to keep the required tolerances. After the end of the standby period, a new provision of the machine tool with new cutting bodies according to above process has to be performed. The effort required for handling, cleaning and logistics is thus very high. Individually controllable insert seats may compensate the tolerances, but the effort required for providing such adjusting devices and setting each individual cutting insert is high.

SUMMARY

This disclosure teaches an improvement to the machine tools known in the art and allows a precise and relatively effortless positioning of removable cutting inserts.

This disclosure is based on the idea that, instead of individually formed insert seats, a geometrically simple base form for all cutting inserts is commonly provided. Thus, according to this disclosure, it is proposed that the tool holder has a cylindrical insert seat shell surrounding the tool axis for radially positioning the cutting inserts, wherein the cutting inserts have at least one contact surface, which may abut against the shell of the insert seat. Due to such cylindrical insert seat shell, a surrounding, convex curved cylinder surface for abutting of the cutting inserts is provided. Thus, it is possible to keep low position tolerances even for machine tools for reaming, without the need for an individual association between the cutting insert and the original insert seat.

The insert seat shell advantageously has the geometric form of a general cylindrical surface, which may be unfolded, without distortions into the plane. Such a general cylindrical surface is defined by a parallel displacement of a straight line along a leading curve.

A further advantageous embodiment is that the insert seat shell has an irregularly curved ring contour. Thus, it is possible, by displacing in the circumferential direction, along the annular contour, to compensate a diameter tolerance. Alternatively, it is also advantageous if the insert seat shell has a uniformly curved (circular) annular contour. In this case it is possible to keep a precise cutting circle independently from the angular position or relative errors.

It is particularly advantageous if the insert seat shell is formed by a grinding surface preferably by round grinding, so that tolerances may be maintained within the μm range, due to technological measures.

The insert seat shell advantageously forms a unitary positioning surface of a plurality of insert seats, which are distributed over its circumference, for the cutting inserts, wherein the cutting inserts may be distributed selectively without a fixed association on the insert seats.

A further technological simplification consists in that the cutting inserts are manufactured with their cutting edges separate from the tool holder.

It is also useful, if the cutting inserts respectively have multiple cutting edges, so that the life span may be correspondingly prolonged.

In order to ensure a defined position holding with simple means, it is advantageous if the cutting inserts are pressed, by the force of a screwing connection against the insert seat shell.

In this context, it is also advantageous if at least a force component of the screwing connection is formed by axial displacement between a screw hole and a screw thread of a clamping screw, so that a multiple-axis fixing is possible.

A particularly simple variant foresees that the cutting inserts are respectively screwed by means of a clamping screw directly on the tool holder.

As an alternative, the cutting inserts may also be clamped by clamping elements screwed onto the tool holder against the insert seat shell. In this case no pass-through holes are required in the cutting inserts.

In order to allow a simple torque driving it is advantageous if the cutting inserts and clamping elements which are alternatively positioned in the circumferential direction of the insert seat shell complement each other to form an annular structure.

An additional function may thus be realized, in that the clamping elements are provided on a clamping surface engaging the cutting inserts with a pocket for housing an inactive cutting edge of the multiple-cutting cutting inserts, so that the unused cutting edge is also protected against chips forming during the machining.

A further advantage in use is that the clamping elements have a channel for feeding refrigerant to the cutting inserts.

In order to ensure a defined, tilting-free support, it is advantageous if the cutting inserts are provided at their contact surfaces with two respective preferably point-like or linear contact sites at an angular distance from each other with respect to the tool axis, for abutting against the insert seat shell.

Such mutually distances contact sites may be freed in that the cutting inserts are provided at their contact surfaces with a respective in particular groove-like cavity, which is parallel to the tool axis.

In order to transfer torques or cutting forces it is advantageous if the cutting inserts are individually supported outside the insert seat shell on a respective shoulder which is anchored or formed on the tool holder.

A further improvement is that the tool holder has an annular shoulder for axial support of cutting inserts, which surrounds the insert seat shell and is positioned in a radial plane of the tool axis.

In an embodiment, which is technologically particularly advantageous, the insert seat shell is formed by a cylindrical or hollow cylindrical front extension of the tool holder.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

Figure 1:
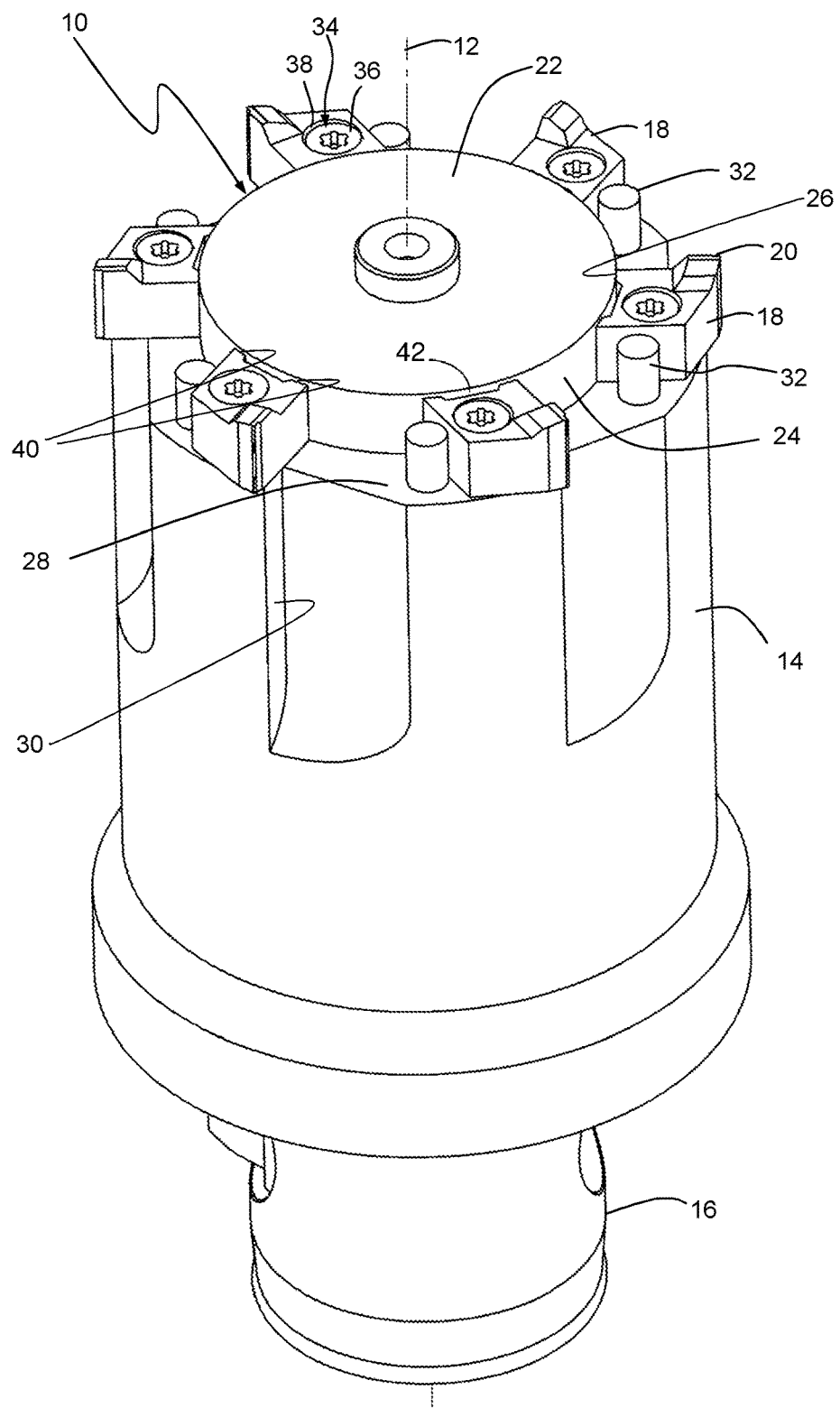
FIG. 1 shows a reaming tool with a cylindrical insert seat shell and cutting inserts positioned on the same in a perspective view.

The embodiments described below are not intended to be exhaustive or to limit the invention to the precise forms disclosed in the following description. Rather, the embodiments are chosen and described so that others skilled in the art may appreciate and understand the principles and practices of this disclosure.

The reaming tools 10 shown in the drawing may be rotably driven for fine machining of a preformed bore in a workpiece by means of a machine tool, by rotating around a tool axis 12 and axially advanced, in order to remove by machining a reaming addition so that an exactly fitting bore having high surface quality is generated. The tool axis may however also be a rotation axis for a workpiece, which is rotated around the tool axis for machining while the machine tool is stationary.

As shown in FIG. 1, the reaming tool 10 has a basically formed cylindrical tool holder 14, which, at its rear end may be connected through a coupling 16 to a housing connectable to a machine mandrel. On the front end of the tool holder or tool basic body 14 a plurality of cutting inserts 18 are distributed in the circumferential direction. The radially outer active cutting edges 20 of these cutting inserts 18 run on a common cutting circle coaxial to the tool axis 12. For a precise radial positioning of the cutting inserts 18, a front extension 22 is provided on the tool holder 14, which forms, on the circumferential side, a cylindrical insert seat shell 24 surrounding the tool axis 12 with a continuously convex curved cylindrical surface. The cutting inserts 18 are contacting with a contact surface 26 on the insert seat shell 24 or its cylindrical surface, as explained in the following.

In FIG. 1, the insert seat shell 24 has a circular cylindrical form. Fundamentally, also general cylindrical surfaces may be used for the insert seat shell, such as those having a generating curve or leading curve, which is partially provided with a different curvature or a polygon. The geometrical particularity of a cylindrical surface is generally that it is a regular surface, which may be unfolded in a plane without distorting. It may also be envisaged that the insert seat shell 24 which has a basic or generally cylindrical form, is provided with recesses between the insert seats, for example in order to free up an inactive cutting edge.

In the example shown of a perpendicular circular cylinder, the insert seat shell 24 may be processed as a grinding surface by round grinding to form a high precisely defined diameter. The insert seat shell 24 thus partially forms insert seats for the cutting inserts 18, which may be distributed, selectively without a fixed association, on the insert seats. The preformed cutting inserts 18 are advantageously positioned on a nominally sized holder and are ground on their cutting edges 20 to a defined diameter.

As shown in FIG. 1, the tool holder 14 has an annular shoulder 28 surrounding the insert seat shell 24, positioned in a radial plane of the tool axis 12, as a bottom support surface for axially supporting the cutting inserts 18. Near their cutting edges 20 clamping grooves 30 for discharging of chips are provided in the shell of the tool holder 14.

In order to also transmit the torques and torsion forces provided during the cutting process, pin-shaped shoulders 32 which are anchored in the annular shoulder 28 are provided outside the insert seat shell 24, which shoulders are used as a supporting face for a lateral insert surface of the associated cutting inserts 18.

For a precise position holding, the cutting inserts 18 are pressed by a screwed connection 34 at the same time against the insert seat shell 24, the annular shoulder 28 and the associated shoulder 32. The screwed connection 34 comprises a respective countersunk head screw 36, which passes through a through-hole 38 of the respective cutting insert 18 and may be screwed with a predetermined axial offset into a threaded bore in the annular shoulder 28, so that also the desired force components for lateral pressing the cutting inserts 18 are applied against the insert seat shell 24 and against the corresponding shoulder 32.

Figure 2:
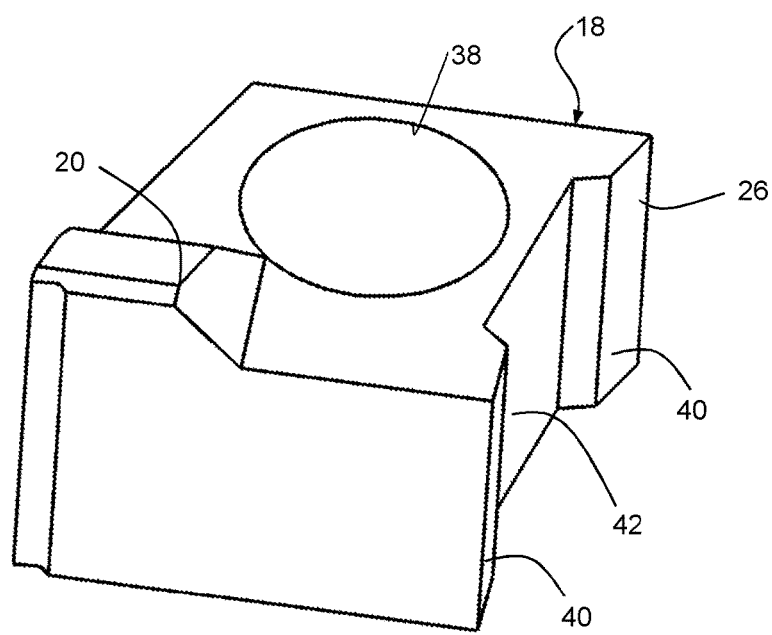
FIG. 2 shows a cutting insert of the reaming tool of FIG. 1 in an enlarged view.

As also shown in FIG. 2, the cutting inserts 18 have, on their contact surface 26 respective two lateral abutment or contact sites 40 formed by lateral plane surfaces, for abutting against the insert seat shell 24. The abutment sites 40 are formed, in a technological advantageous way, by planar surfaces, but may also have a convex contour. In the mounted state of the cutting inserts 18, these abutment sites 40 are positioned, with respect to the tool axis 12 at an angular distance from one another and are linear and have parallel axes, so that a univocally determined radial support is obtained. To this end, a central through aperture 42 parallel to the tool axis 12 is provided between the abutment sites 40, which has a concave, in particular groove-like or slot-like cross sectional contour. Thus, between the two contact sites 40, the cutting inserts 18 are spaced from the insert seat shell 24, and the spacing defines the apertures 42.

In the following examples, same or similar parts are provided with the same references, as previously described.

Figure 3:
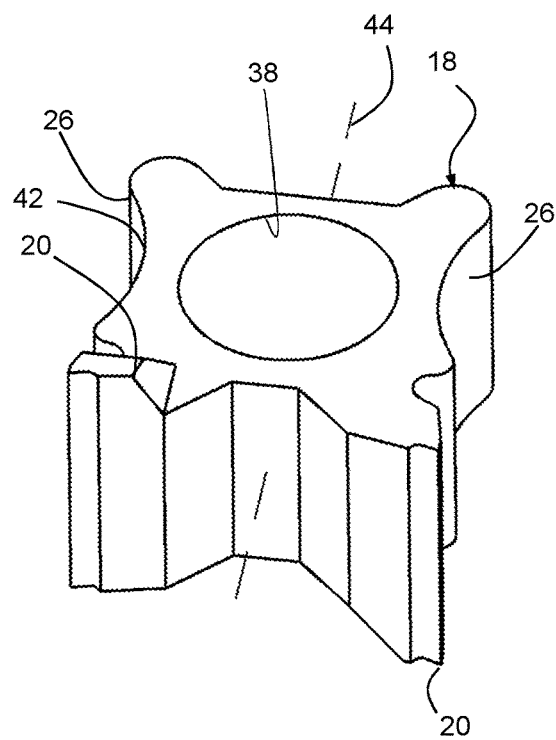
FIGS. 3 and 4 show further embodiments of cutting inserts.

FIG. 3 shows an example of a double-edge cutting insert 18, which is formed with a point-symmetry as a helical cutting insert, with respect to a symmetry axis 44 passing transversally with respect to the through bore 38. A respective contact surface 26 is provided for both cutting edges 20. The cutting edges 20 extend in opposite directions beyond the front surfaces surrounding the pass-through bore 38. The unused second cutting edge 20 may then be received in an annular notch adjacent to the insert seat shell 24 in the bottom support surface or annular shoulder 28 of the tool holder 14. If the second cutting edge 20 has to be used, then the cutting insert 18 is released and rotated by 180° around the symmetry axis 44.

Figure 4:
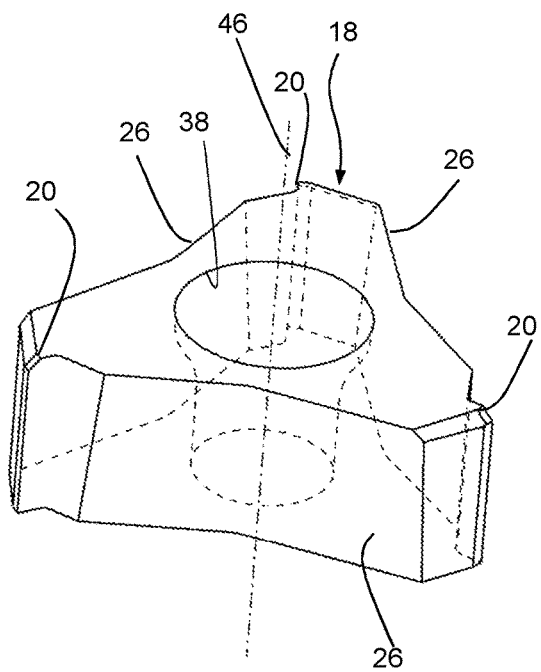

FIG. 4 shows an alternative triple-edged cutting insert 18. This insert also has three contact surfaces 26 and may be rotated by 120° around the boring axis 46 for performing an insert replacement.

Figure 5:
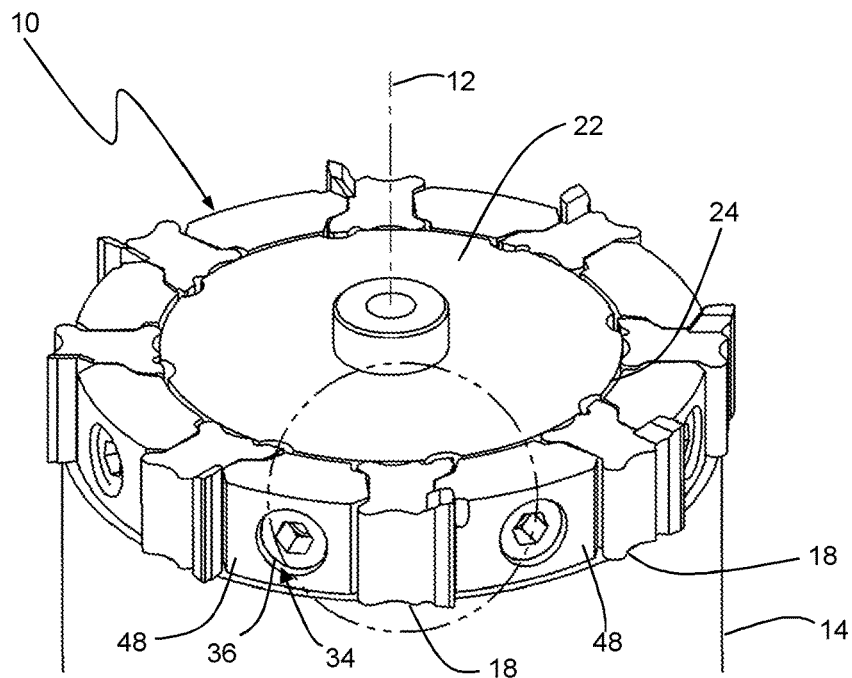
FIG. 5 shows a second embodiment of a reaming tool in a cut-out perspective view.

The example of FIG. 5 of a reaming tool 10 differs from the example of FIG. 1 essentially in the fact that the cutting inserts 18 lack bores and are not directly screwed, but indirectly clamped by clamping elements 48 against the insert seat shell 24. The clamping elements 48 are respectively fixed by a screw 36, which is radially screwed into the front extension 22. The cutting inserts 18 which are alternately arranged in the circumferential direction of the insert seat shell 24 and the clamping elements 48 complement with a form fit in order to form an annular structure, so that additional shoulders (pins 32 in FIG. 1) may be omitted.

Figure 6:
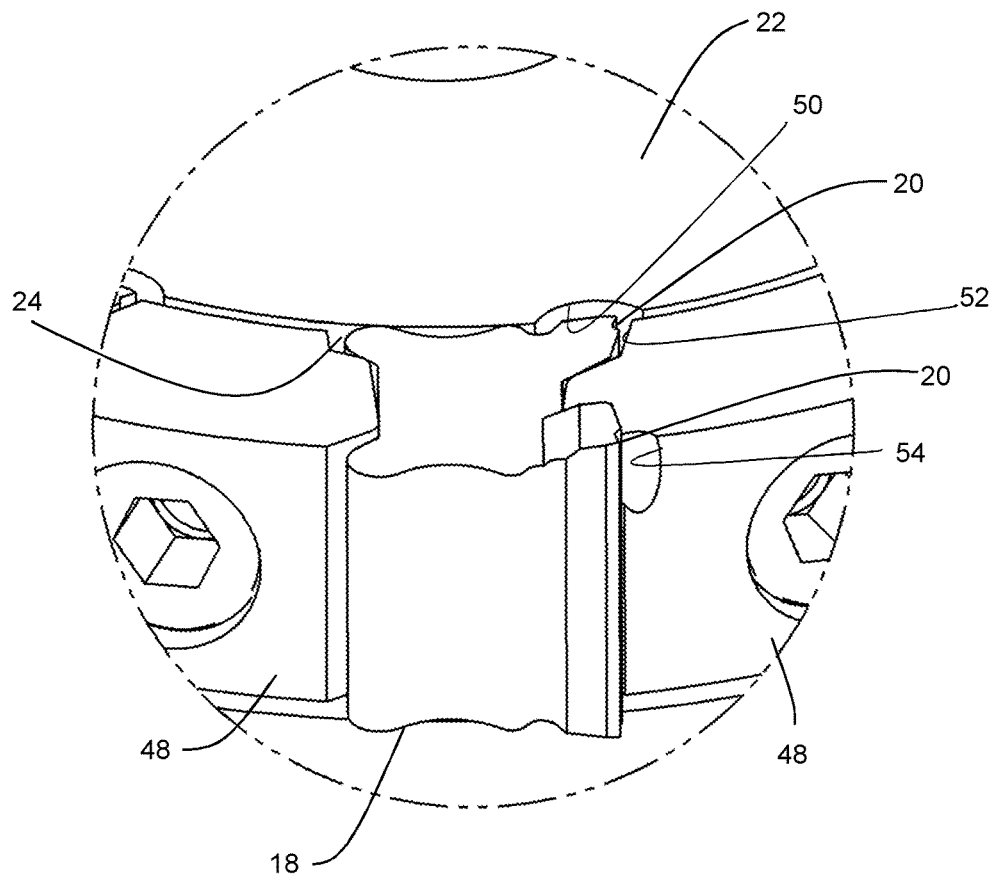
FIG. 6 shows an enlarged detail of the area marked in FIG. 5.

As best shown in FIG. 6, in the insert seat shell 24 axial hollow grooves 50 are provided which form a free space for a non-active second cutting edge 20. Also, the clamping elements 48 may be provided on their clamping surface engaging the cutting insert 18 with a pocket or recess 52 to protect the unused cutting edge 20. An additional functional extension may consist in that the clamping elements have a channel 54 opening in the area of the active cutting edge 20 for feeding refrigerant.

Figure 7:
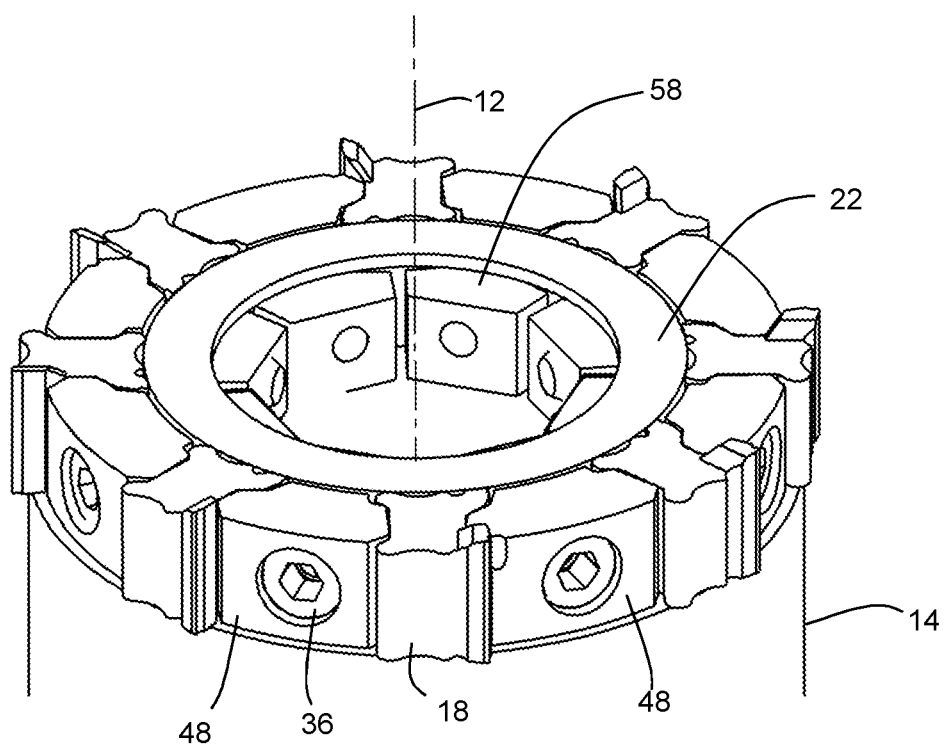
FIG. 7 shows a third embodiment of a reaming tool in a cutout perspective view.
Figure 8:
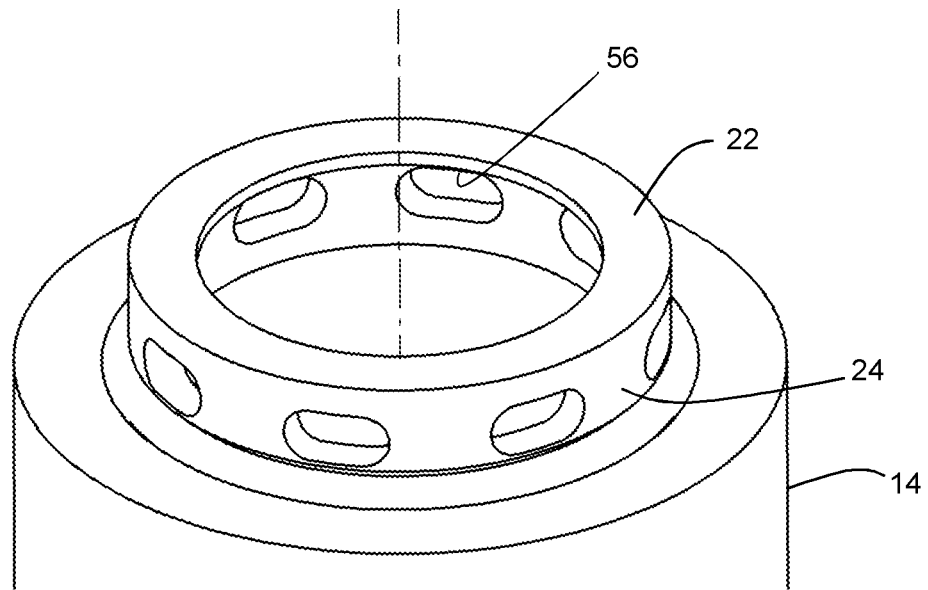
FIG. 8 shows the tool holder of the reaming tool of FIG. 7 without the cutting inserts and the clamping elements.

In the example shown in FIGS. 7 and 8, the insert seat shell 24 is formed by a hollow cylindrical annular extension 22, which is provided with slots 56 on its circumference. Herein also cutting inserts 18 and clamping elements 48 are alternately positioned in the circumferential direction. The clamping elements 48 however are fixed by a screw 46 in a respective groove block 58 on the inside of the annular extension 22. Thus, the position of the cutting inserts 18, their number as well as their uniform or non-uniform distribution may be freely selected. In order to obtain irregular divisions between the cutting inserts 18, the length of the clamping elements 48 may be varied correspondingly.

Figure 9:
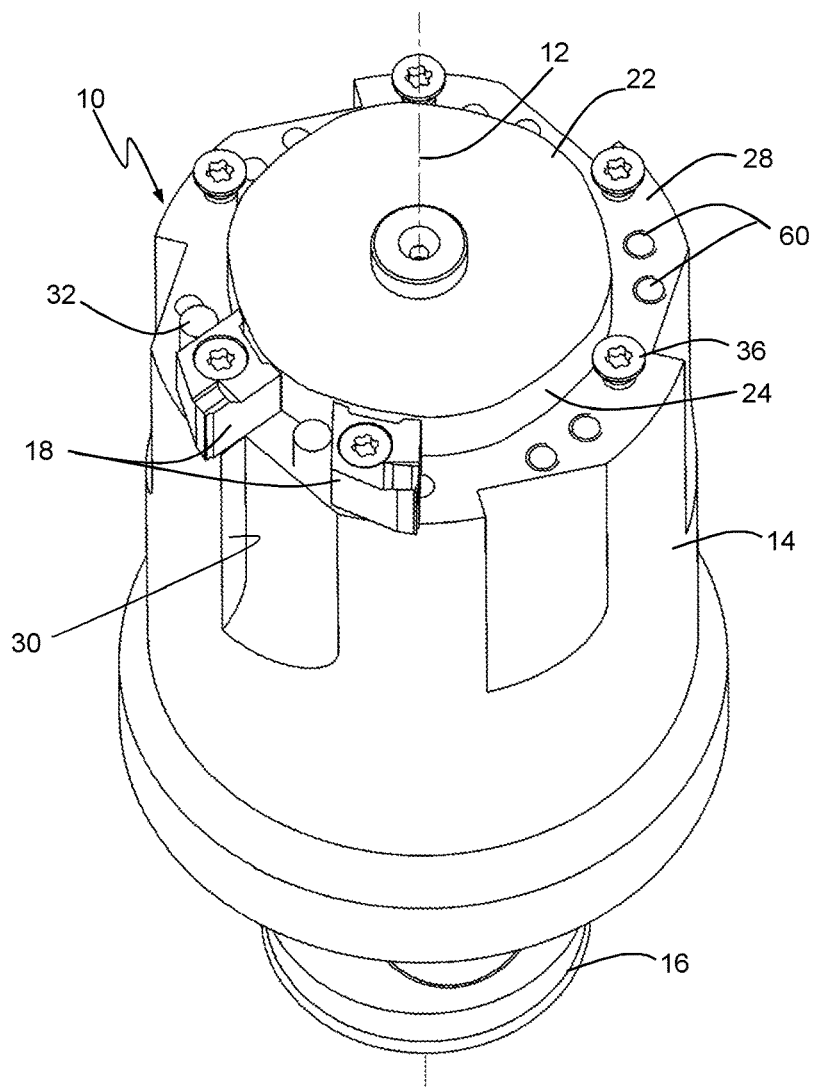
FIG. 9 shows a fourth embodiment of a reaming tool in a perspective view.
Figure 10:
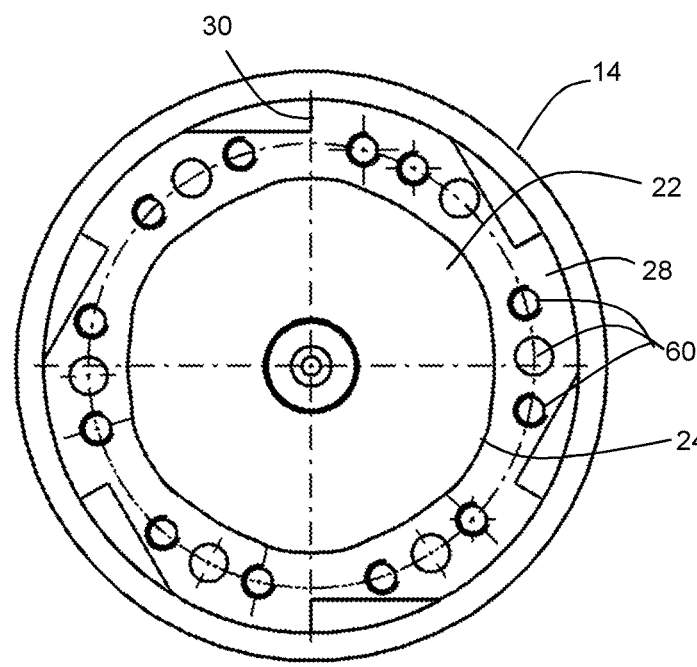
FIG. 10 shows the tool holder of the reaming tool of FIG. 9 in a front view.

FIGS. 9 and 10 show an example with a partially differently curved insert seat shell 24. The number of these circumferential portions depends on the predetermined number of cutting inserts 18, of which only two are shown as an example in FIG. 9. Due to a displacement of the cutting inserts 18 along the insert seat shell 24, different cutting diameters, preferably in the µm range, may be provided. Moreover, due to the displacement it is possible to compensate manufacturing tolerances or wear of the cutting edges. In order to transmit torques, herein, for each insert seat several bores 60 in the annular shoulder 24 of the tool holder 14 are provided, in which the shoulders 32 and the clamping screws 36 may be selectively positioned.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A machine tool for fine machining of bores, comprising:
   a tool holder configured to rotate relative to a workpiece to be machined and having a tool axis;
   a plurality of cutting inserts removably attached to the tool holder, the active cutting edges of the cutting inserts having a common cutting circle that is coaxial to the tool axis; and
   the tool holder having an insert seat shell configured for radially positioning the cutting inserts, the insert seat shell extending circumferentially around the tool axis;
   wherein each cutting insert has two contact sites that abut the insert seat shell, the two contact sites being separated by an angular distance with respect to the tool axis;
   wherein the contact sites of the plurality of cutting inserts abut portions of the insert seat shell located on a common circular cylindrical contour.

2. The machine tool of claim 1, wherein the insert seat shell has an irregular or regularly curved annular contour.

3. The machine tool of claim 1, wherein the insert seat shell has a circular cylindrical contour.

4. The machine tool of claim 1, wherein the insert seat shell is formed by grinding.

5. The machine tool of claim 1, wherein the cutting inserts are separately manufactured from the tool holder.

6. The machine tool of claim 1, wherein each cutting insert has more than one cutting edge.

7. The machine tool of claim 1, wherein the cutting inserts are pressed against the insert seat shell via a screw connection.

8. The machine tool of claim 7, wherein at least one force component of the screw connection is formed by an axial offset between a screw hole and a screw thread of a clamping screw.

9. The machine tool of claim 1, wherein each cutting insert is screwed directly to the tool holder by a respective clamping screw.

10. The machine tool of claim 1, wherein each cutting insert is clamped against the insert seat shell by a respective clamping element that is screwed to the tool holder.

11. The machine tool of claim 10, wherein the cutting inserts and the clamping elements are alternately positioned in the circumferential direction of the insert seat shell, the clamping elements and the cutting inserts collectively forming an annular structure.

12. The machine tool of claim 10, wherein each cutting insert has an inactive cutting edge and the clamping elements each have a pocket for receiving a respective one of the inactive cutting edges.

13. The machine tool of claim 10, wherein each clamping element has a channel configured for feeding refrigerant to a respective one of the cutting inserts.

14. The machine tool of claim 1, wherein each cutting insert is provided on a contact surface thereof with a recess oriented parallel to the tool axis.

15. The machine tool of claim 1, wherein each cutting insert is additionally supported outside the insert seat shell on at least one respective shoulder which is anchored or formed on the tool holder for transmitting torques.

16. The machine tool of claim 1, wherein the tool holder has an annular shoulder surrounding the insert seat shell and disposed in a radial plane of the tool axis for axially supporting the cutting inserts.

17. The machine tool of claim 1, wherein the insert seat shell is formed by a cylindrical or hollow cylindrical front extension of the tool holder.

18. The machine tool of claim 1, wherein an aperture is formed between the two contact sites of each cutting surface.

19. The machine tool of claim 18, wherein, in a location between the two contact sites of each cutting surface, the cutting insert is spaced from the insert seat shell.

20. A machine tool for fine machining of bores, comprising:
- a tool holder configured to rotate relative to a workpiece to be machined and having a tool axis;
- a plurality of cutting inserts removably attached to the tool holder, the active cutting edges of the cutting inserts having a common cutting circle that is coaxial to the tool axis; and
- the tool holder having an insert seat shell configured for radially positioning the cutting inserts and being rotatable about the tool axis, wherein the insert seat shell has an irregular or regularly curved annular contour;
- wherein each cutting insert has two contact sites that abut the insert seat shell, the two contact sites being separated by an angular distance with respect to the tool axis.

21. A machine tool for fine machining of bores, comprising:
- a tool holder configured to rotate relative to a workpiece to be machined and having a tool axis;
- a plurality of cutting inserts removably attached to the tool holder, the active cutting edges of the cutting inserts having a common cutting circle that is coaxial to the tool axis; and
- the tool holder having an insert seat shell configured for radially positioning the cutting inserts and being rotatable about the tool axis;
- wherein each cutting insert has two contact sites that abut the insert seat shell, the two contact sites being separated by an angular distance with respect to the tool axis;
- wherein each cutting insert is additionally supported outside the insert seat shell on at least one respective shoulder which is anchored or formed on the tool holder for transmitting torques.

* * * * *